June 7, 1938.  J. SUNNEN  2,120,080
BEARING REAMER
Filed April 6, 1936  2 Sheets-Sheet 1
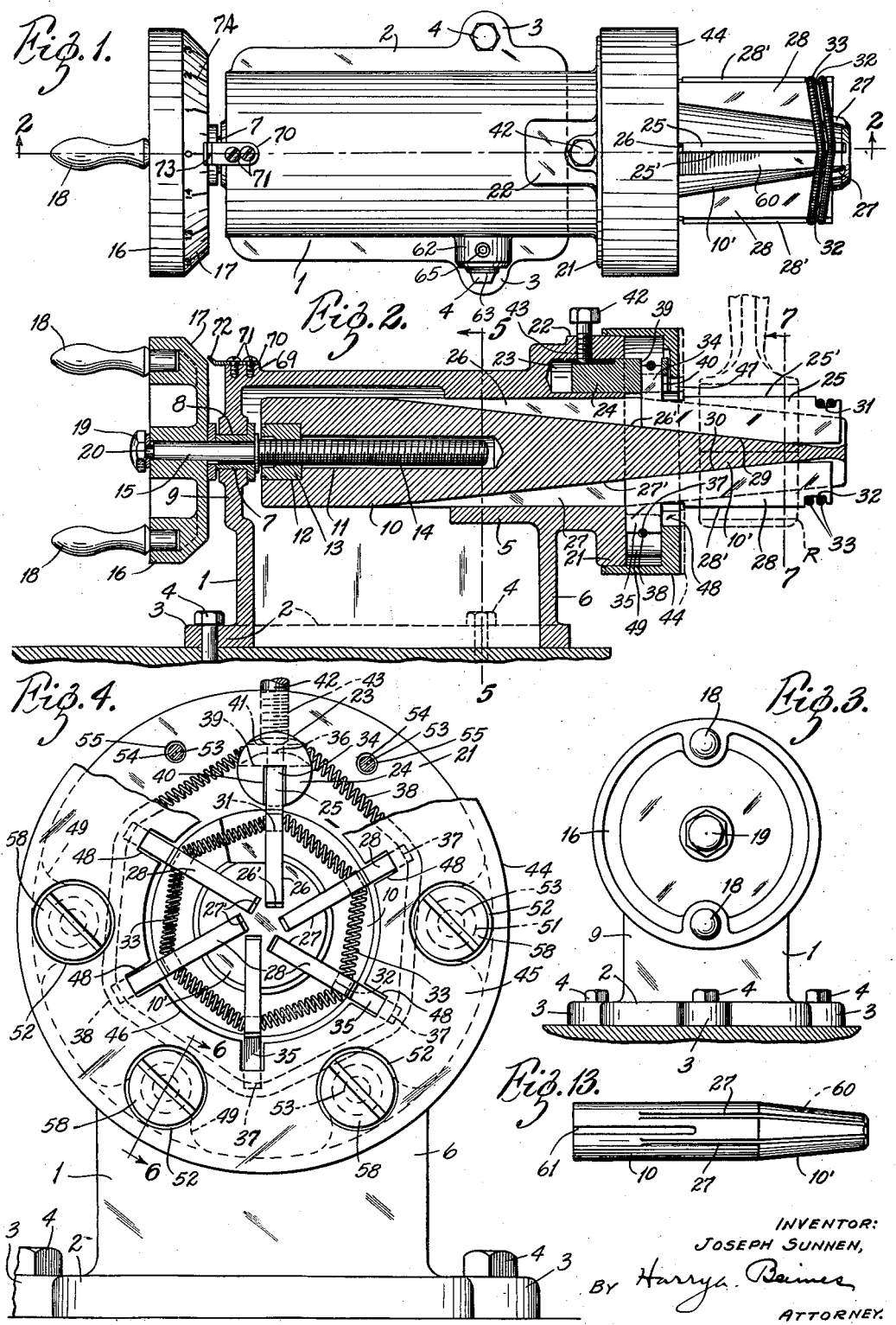
INVENTOR:
JOSEPH SUNNEN,
By Harry A. Beimes
ATTORNEY.

June 7, 1938.  J. SUNNEN  2,120,080
BEARING REAMER
Filed April 6, 1936   2 Sheets-Sheet 2
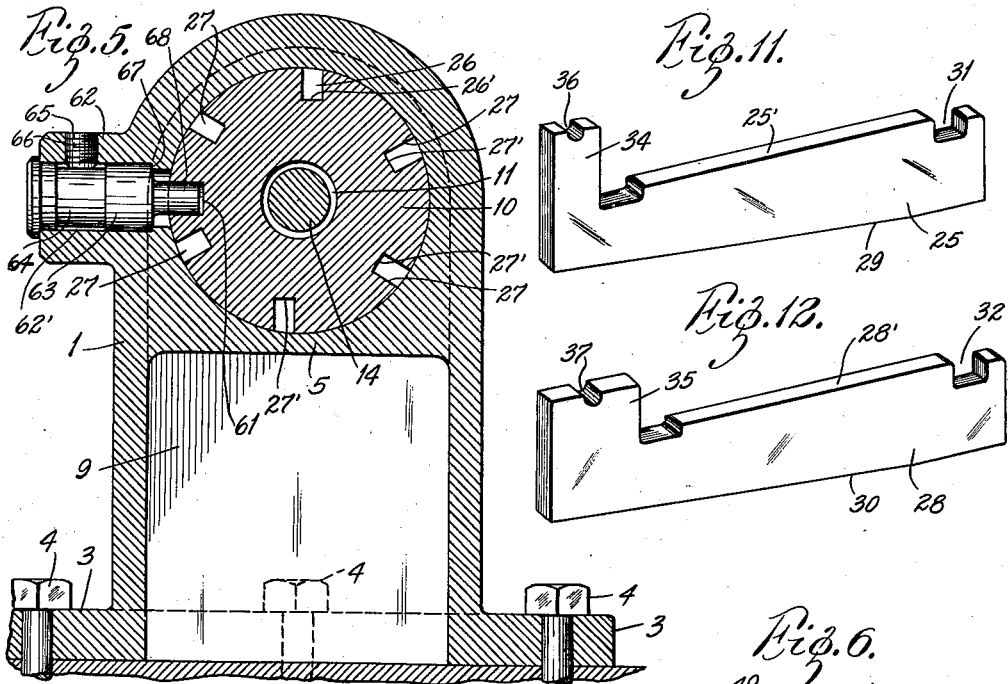
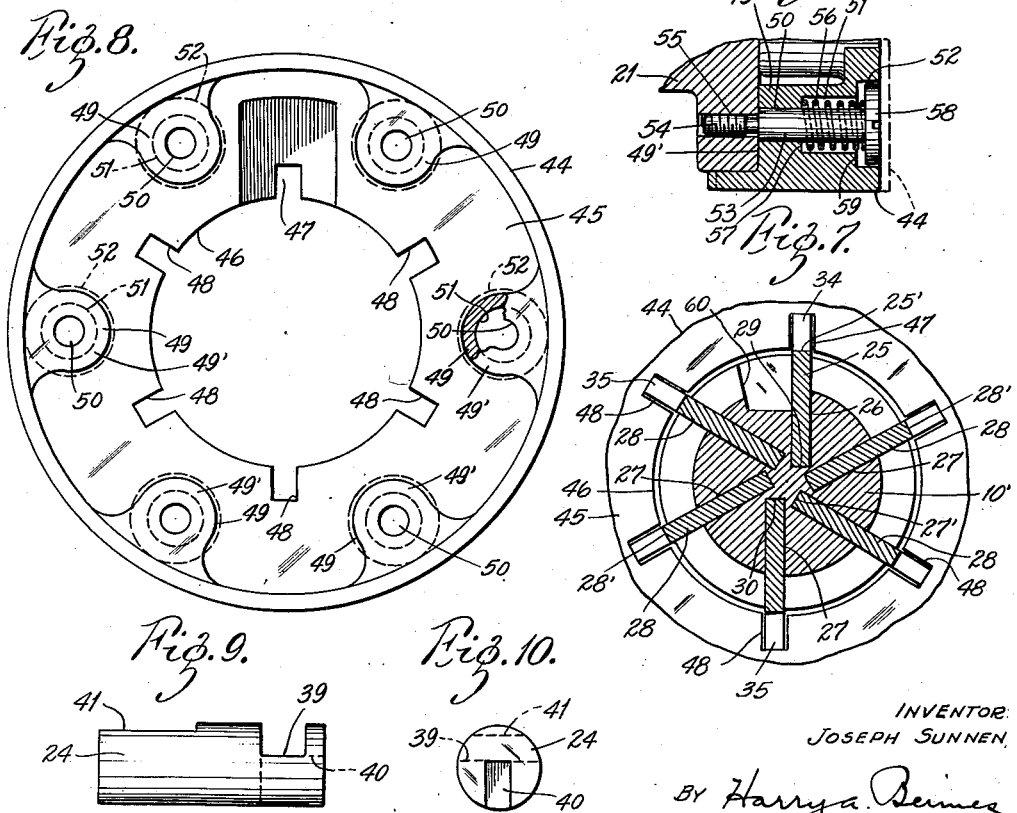
INVENTOR:
JOSEPH SUNNEN,
BY Harry A. Beimes
ATTORNEY.

Patented June 7, 1938

2,120,080

UNITED STATES PATENT OFFICE 2,120,080

BEARING REAMER

Joseph Sunnen, Kirkwood, Mo.

Application April 6, 1936, Serial No. 72,884

6 Claims. (Cl. 77—75.5)

My invention has relation to improvements in reamers and it consists in the novel features of construction more fully set forth in the specification and pointed out in the claims. The invention is particularly adapted for reaming bearings or other cylindrical holes in which the metal to be cut by the reaming operation is nonferrous, such as Babbitt metal or bronze.

The principal object of the invention is to provide a reamer that will operate evenly and smoothly in the bearing being reamed without "hanging up" or chattering. I accomplish this object by providing for the cutter head a firm bearing in the hole being reamed and arranging the cutting blade and guides so that they will trail with respect to the center lines on which they are disposed.

A further object of the invention is to provide a reamer having but a single cutter which is maintained in operative relation with the work by a plurality of spring-pressed guides which cooperate with the cutter during the reaming operation to produce a true cylindrical hole.

Another advantage of my improved reamer is that the yielding pressure of the guides against the work maintains a substantial bearing of the cutter head in the work automatically throughout the reaming operation.

Further and other advantages will be better apparent from a detailed description of the invention in connection with the accompanying drawings, in which:—

Figure 1 is a top plan of my improved reamer; Fig. 2 is a vertical longitudinal section taken on the line 2—2 of Fig. 1; Fig. 3 is an end elevation thereof looking toward the operating hand wheel; Fig. 4 is an enlarged end elevation looking toward the cutter head with parts broken away; Fig. 5 is a vertical cross-sectional view taken on the line 5—5 of Fig. 1; Fig. 6 is a cross-sectional view through the cutter head taken on the line 6—6 of Fig. 4; Fig. 7 is a vertical cross-sectional view taken on the line 7—7 of Fig. 1; Fig. 8 is an inside plan view of the guide retainer or cutter head cap; Figs. 9 and 10 are side view and end view, respectively, of the cutter retaining plug; Figs. 11 and 12 are perspective views of the cutter and one of the guides, respectively; and Fig. 13 is a side elevation of the reamer body which supports the cutter and guide blades.

Referring to the drawings, 1 represents a cast housing in the bottom flange 2 of which are formed a plurality of slotted lugs 3 through which bolts 4 may be passed for the purpose of securing the housing to a bench. A bearing 5 is formed integral with the front wall 6 of the housing 1 and a bearing 7 is mounted in an opening 8 in the real wall 9 of said housing. A cylindrical member 10, which serves as the reamer body, is mounted for sliding movement in the bearing 5 and is provided with an axial bore 11 and counter-bore 12, in the latter of which an adjusting nut 13 is tightly fixed.

An adjusting screw 14 traverses the nut 12 and extends into the bore 11 and has a shaft portion 15 mounted for rotation in the bearing 7, on the outer end of which shaft is fixed a hand wheel 16 having a beveled face 17 and a pair of oppositely disposed handles 18, 18. A retaining nut 19 is screwed over the threaded extremity 20 of the shaft 15 and serves to hold the hand wheel 16 on the shaft.

Bearing 5 has an outwardly presented flange 21 with the rear of which merges an enlargement 22 formed on the top of the housing 1. A bore 23 extends through the flange 21 and into the enlargement 22 and has a plug 24 disposed in it which engages with the cutting blade 25 (more fully hereinafter described) to hold the latter securely in place.

The reamer body 10 terminates in a conical portion 10' in which there are six evenly spaced slots 26 and 27 extending upwardly from the end of the reamer body. The bottom surface 26' of slot 26 and 27' of the slots 27 incline upwardly to the rear until they leave the reamer body and merge with the cylindrical surface near the rear end thereof. It will be observed (Fig. 7) that the slots 26 and 27 are offset with respect to the center lines of the reamer body with which they contact. By virtue of the disposition of slots 26 and 27 the leading edge (with respect to the direction of relative rotation between the reamer and the work) of each blade is disposed on a radius of the reamer body 10 so that the cutting blade 25 in slot 26 and guides 28 in slots 27 are to the rear of their respective center lines, and the land 25' of the cutting blade 25 and the lands 28' of the guides 28 will trail or lag behind said center lines.

This is an important feature in the invention as it contributes very largely to the smooth operation of the cutter head, comprising the tapered portion 10' of the reamer body, blade 25 and guides 28.

The bottom surface 29 of cutter 25 and bottom surface 30 of guides 28 are inclined to correspond with the angle of inclination of the bottoms 26' and 27' of slots 26 and 27, respectively, so that when the blade 25 and the guides 28 are disposed in their respective slots and rest on the bottoms thereof the cutting edge 25' of cutter 25 and the lands 28' of guides 28 will lie on the surface of a true cylinder. Adjacent to the forward edge of blade 25 is a recess 31 and adjacent to the forward edges of each guide 28 is a recess 32, and a coiled spring 33 is wrapped twice around the blade and guides and nested in the recesses 31 and 32 for the purpose of holding the blade and guides down in their respective slots. At the rear of blade 25 there is an upwardly projecting lug 34 and at the rear of each of the guides 28 is a projecting lug 35 and the outer edges of lugs 34 and 35 are provided with recesses 36, 37, respectively. A coiled spring 38 is wrapped around the inner ends of blade 25 and guides 28 and rest in the notches 36 and 37. The coiled spring 38 cooperates with the spring 31 to draw the blade 25 and guides 28 radially together so that they will always be seated in the slots 26 and 27. The plug 24 is provided with a transverse notch 39 near its forward end and intersecting longitudinal slot 40 and the lug 34 of cutter 25 extends through the slot 40 into the transverse notch 39.

Said plug 24 is also provided with a flat face 41 adjacent to its rear and against which bears the end of a set screw 42 threaded into a tapped opening 43 whereby the plug 24 is securely held in place and in turn holds the blade 25 in fixed position longitudinally with respect to the reamer housing 1. A flat face 60 is formed on the surface of the conical portion 10' of the body 10 adjacent to and in front of (with respect to relative rotation of cutter head and work) the slot 26 for the purpose of providing a chip clearance to receive the chips coming from the blade 25 in the cutting operation.

A cap 44 is disposed on the flange 21 of housing 1 and the outer wall 45 of said cap is provided with a central opening 46 from which slots 47 and 48 radiate. The slots 47 and 48 are spaced to correspond to the spacing of the slots 26 and 27 in the reamer body 10 and when the cap is in place the slots 47 and 48 are opposed to the slots 26 and 27.

A plurality of bosses 49 are formed inside of the cap 44, said bosses being equally spaced and disposed in alternation with the slots 47 and 48. Centrally disposed in each boss 49 is a bore 50, counter-bore 51 and counter-bore 52 and a screw 53 is disposed in the bore 50 and has its inner threaded extremity 54 screwed into a tapped opening 55 in flange 21. A coiled spring 56 is disposed over the screw 53 and bears against shoulder 57 between bore 50 and counter-bore 51 and also bears against the screw head 58.

It will be observed in Fig. 6 that when the inner face 49' of boss 49 bears against the outer surface of flange 21, under the tension of the spring 56, there will be a small clearance between the screw head 58 and shoulder 59, between counter-bore 51 and counter-bore 52. At this time the cap 44 is in its innermost position and the cutter head is in its inoperative or "at rest" position and there is no pressure on the guides 28. However, if a work piece such as a connecting rod R is disposed over the cutter head and the set screw 42 loosened so as to release the blade 25 from its fixed position, the advancing of the reamer body 10, after the guides contact with it and are confined by the work piece, will cause said guides to travel outwardly with the reamer body and carry the cap 44 outwardly with them until shoulder 59 contacts the head 58 of screw 50 and spring 56 is under compression. The purpose of thus placing the guides 28 under compression will be more fully described in connection with the operation of the invention.

In order to prevent rotation of the reamer body 10 during the operation of the hand wheel 16, a longitudinally disposed groove 61 is formed in its periphery and extends from about the middle of the reamer body to the rear end thereof for cooperating with the pin 63, which is secured in a bore 62' in boss 62 projecting from the side of the reamer body. The pin 63 has a reduced portion 64 against which bears set screw 65 threaded in a tapped opening 66 in the boss 62.

A shoulder 67 is formed near the inner end of the bore 62' to limit the inward extent of the pin 63 so that the reduced extremity 68 thereof may not impinge on the bottom of the slot 61 to interfere with the free sliding movement of the reamer body 10.

A boss 69 is formed on the top and at the rear end of housing 1 and a plate 70 is fixed by screws 71 to said boss. The outer end of said plate has an upwardly projecting lip 72 on which is marked a line 73 to which the graduations 74 on beveled face 17 of wheel 16 are referred in order to measure the extent to which the cutter head is advanced or expanded. Each of the numerals which comprise the scale on the face 17 denote .001 of an inch.

In the operation of the reamer the adjusting wheel 16 is turned so as to retract the guide blades 28 and cutter 25 to a point where the bearing R may be passed over the cutter head. The set screw 42 for the cutter blade 25 is then loosened and the adjusting wheel 16 turned until the guides 28 bear against the bearing R. The operator then turns the adjusting wheel about .004 further on the dial. This last turning causes the entire head to move outwardly with the adjusting cone 10' placing the compression springs 56 under compression. The cutter 25 is then manually pushed back on the cone until it strikes the work. The set screw 42 is then tightened so as to lock the cutter 25 to the housing 1, although it is free to move radially outward. The cutter is now properly set relative to the guides and the guides are under compression.

The reaming operation may now be begun by revolving the connecting rod R about the cutter head. Obviously the cutter 25 reams out the bearing as it rotates over the cutter head and continues its reaming so long as the operator continues to advance the cutter head by rotating the adjusting wheel 16.

It should be observed that the spring pressure behind the guides 28 causes them to bear firmly against the surface of the bearing, even after the action of the cutter has enlarged the bore of the bearing. However, the cutter is rigidly mounted and, as the bore of the bearing is enlarged, must be advanced by turning the adjusting wheel 16. The advancing of the cutter 25 does not disturb the spring pressure behind the guides since they are advanced an equal amount by the forward movement of the adjusting cone 10'.

The present invention may be used as a burnishing tool as well as a reamer, without the necessity of adjusting the cutter blade 25. This is possible because the guides 28 expand into the enlarging hole during the cutting action of the blade 25 while the circumferential path of the blade 25 is constant, except when advanced by the adjusting wheel 16. As the hole is enlarged the springs 56 force the cap 44 inwardly. Since the guide blades 28 are held to the cap by lugs 37, these blades will move back with the cap and slide up the inclined bottoms of the slots 26. This movement of the guides continues until the cutter blade 25 (which has not moved) ceases to cut. The guides are then riding against the wall of the hole and the tool is acting as a burnishing device. It should be noted that although the guides expand radially under the influence of spring 56, they, nevertheless, have rigid support on the bottoms 26' of the grooves 26.

Having described my invention, I claim:

1. A reamer comprising a housing, a reamer body slidably mounted in said housing and having a plurality of longitudinally extending grooves spaced around the periphery thereof, a cutter disposed in one of said grooves, guide members in other grooves, the engaging surfaces of the grooves with the cutter and guides comprising planes inclined to the longitudinal axis of the reamer body for effecting radial adjustment thereof with longitudinal movement of the reamer body, a cap disposed over the cutter and guides and yieldingly fixed to the housing, said guides having engagement with the cap to cause the guides and the cap to move longitudinally outwardly with the reamer body when restrained against radial movement, means for anchoring the cutter on the housing while permitting said cutter to move radially in its groove in the reamer body, and means for moving the reamer body in the housing.

2. A reamer comprising a housing, a cutter head supported by said housing, said head comprising a cutter blade, a plurality of guide blades, and a body member carrying said blades and serving as a rigid support therefor, spring actuated means interposed between the housing and the guide blades and effective to move the guide blades for expanding the same when not restrained by the work piece, and means for moving the body member longitudinally to expand the cutter blade and the guide blades.

3. A reamer comprising a housing, a cutter head supported by said housing, said head comprising a cutter blade, a plurality of guide blades, and a body member carrying said blades and serving as a rigid support therefor, a cap disposed over the guide blades and in engagement therewith, spring means interposed between the housing and the cap for expanding the guide blades when not restrained by the work piece, means for moving the body member longitudinally to expand the cutter blade and the guide blades, and said cutter blade having longitudinally adjustable connection with and rigid support against the housing.

4. A reamer comprising a housing, a cutter head supported by said housing, said head comprising a cutter blade, a plurality of guide blades, and a body member carrying said blades and serving as a rigid support therefor, a cap disposed over the guide blades and in engagement therewith, spring means interposed between the housing and the cap for expanding the guide blades when not restrained by the work piece, and means for moving the body member longitudinally to expand the cutter blade and the guide blades, all of said blades being angularly spaced and disposed off-center with respect to the body member.

5. A reamer comprising a housing, a cutter head supported by said housing, said head comprising a cutter blade, a plurality of guide blades, and a body member having inclined planes on which the blades are rigidly supported, spring actuated means cooperating with the housing for moving the guide blades longitudinally with respect to the housing to cause said blades to move upwardly on said inclined planes as the cutter enlarges the hole in the work piece, and means for feeding cutter blade and guide blades radially outward.

6. A reamer comprising a housing, a cutter head supported in said housing, said head comprising a body member having a plurality of radially disposed grooves with inclined bottoms converging toward the outer end of said body member, a cutter blade and a plurality of guide blades disposed in said grooves in contact with the inclined bottoms thereof, means for moving the body member longitudinally to impart outward radial movement to said blades, and spring actuated means interposed between the housing and the guide blades for expanding the guide blades when not restrained by the work piece.

JOSEPH SUNNEN.